United States Patent
Jain

(10) Patent No.: US 11,249,648 B2
(45) Date of Patent: Feb. 15, 2022

(54) TRANSFER AND PROCESSING UNIT FOR IOD SSD

(71) Applicant: Kioxia Corporation, Tokyo (JP)

(72) Inventor: Amit Rajesh Jain, Cupertino, CA (US)

(73) Assignee: Kioxia Corporation, Tokyo (JP)

(*) Notice: Subject to any disclaimer, the term of this patent is extended or adjusted under 35 U.S.C. 154(b) by 0 days.

(21) Appl. No.: 16/523,922

(22) Filed: Jul. 26, 2019

(65) Prior Publication Data

US 2021/0026538 A1 Jan. 28, 2021

(51) Int. Cl.
| | |
|---|---|
| G06F 12/00 | (2006.01) |
| G06F 3/06 | (2006.01) |
| G06F 12/02 | (2006.01) |
| G06F 12/1009 | (2016.01) |

(52) U.S. Cl.
CPC .......... *G06F 3/0611* (2013.01); *G06F 3/0658* (2013.01); *G06F 3/0679* (2013.01); *G06F 12/0246* (2013.01); *G06F 12/1009* (2013.01)

(58) Field of Classification Search
CPC .. G06F 3/0611; G06F 3/0679; G06F 12/0246; G06F 3/0658; G06F 12/1009
USPC ....................................................... 711/154
See application file for complete search history.

(56) References Cited

U.S. PATENT DOCUMENTS

| | | |
|---|---|---|
| 2007/0183179 A1 | 8/2007 | Maeda et al. |
| 2014/0189205 A1 | 7/2014 | Sinclair et al. |
| 2017/0004039 A1* | 1/2017 | Maffeis .............. G06F 11/1012 |
| 2018/0081584 A1* | 3/2018 | Nam .................... G06F 3/0616 |
| 2019/0042150 A1 | 2/2019 | Wells et al. |
| 2019/0073302 A1 | 3/2019 | Allison et al. |

OTHER PUBLICATIONS

Foreign Search Report on PCT PCT/IB2020/056932 dated Oct. 20, 2020.
Carlson, Mark, "Achieving Predictable Latency for Solid State Drives," Storage Developer Conference EMEA, pp. 1-32, 2018.

* cited by examiner

*Primary Examiner* — Mardochee Chery
(74) *Attorney, Agent, or Firm* — Foley & Lardner LLP

(57) ABSTRACT

Various implementations described herein relate to systems and methods for defining an optimal transfer and processing unit (OTPU) size for communicating messages for a plurality of non-volatile memory (NVM) sets of a non-volatile memory of the SSD. Each of the plurality of NVM sets corresponds to one of a plurality of regions of the non-volatile memory. Each of the plurality of regions includes a plurality of dies.

20 Claims, 9 Drawing Sheets

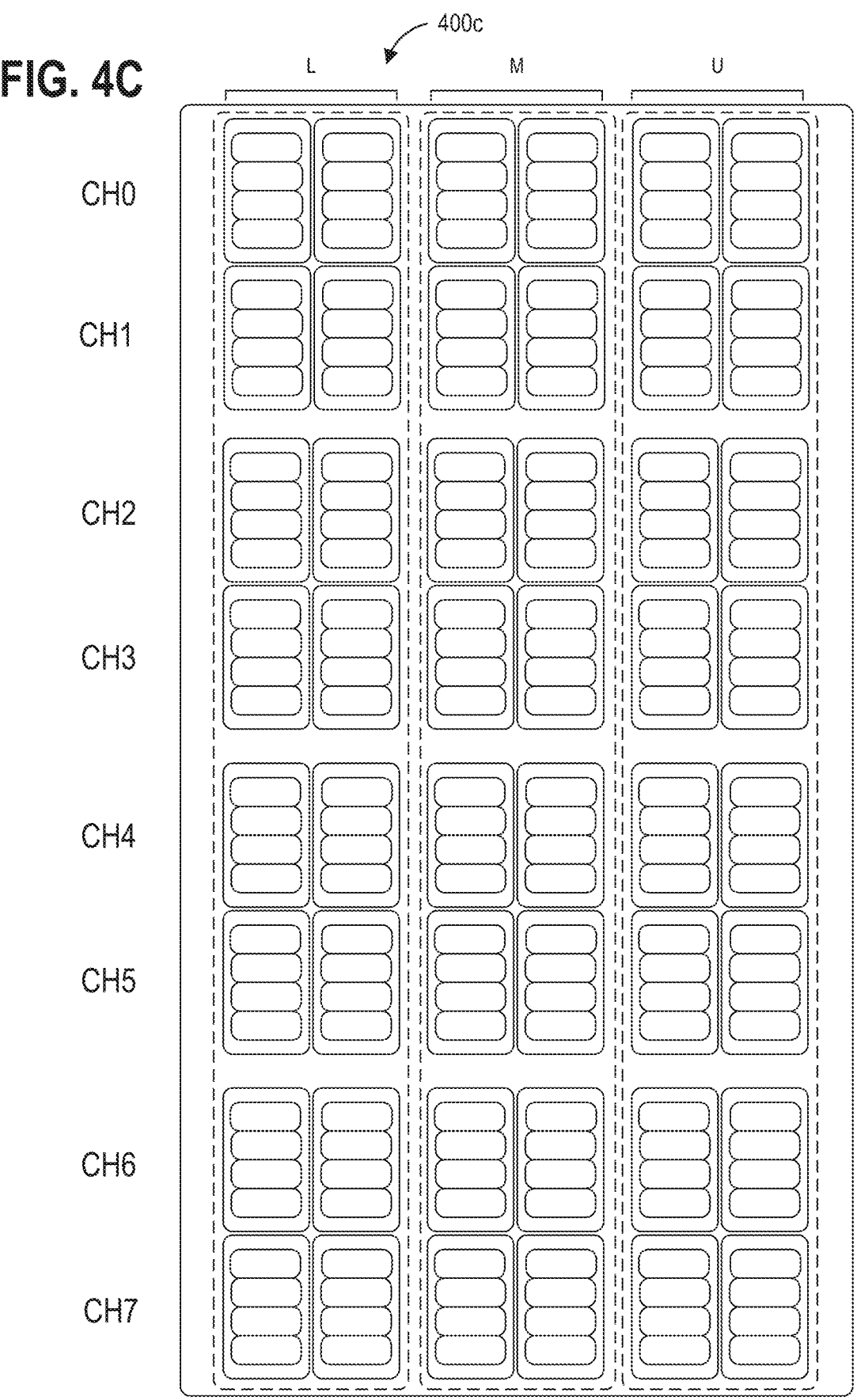

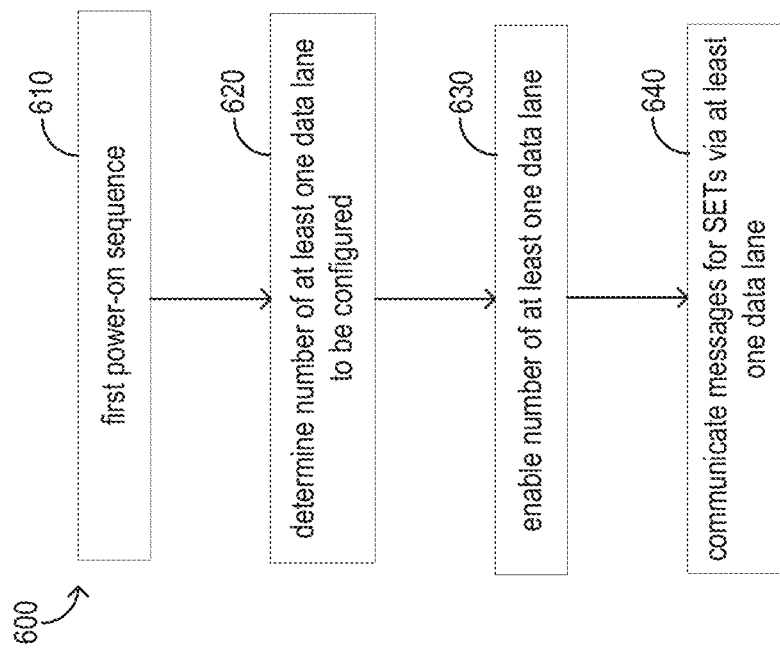

TRANSFER AND PROCESSING UNIT FOR IOD SSD

TECHNICAL FIELD

The present disclosure generally relates generally to systems and methods for providing input/output (I/O) deterministic (IOD) solid state drives (SSDs).

BACKGROUND

A SSD includes a number of non-volatile memory devices such as, but not limited to, NAND flash memory devices controlled by a controller such that the NAND flash memory devices behaves like a single drive. The NAND flash memory devices are subject to host originated I/O operations such as reading and writing data stored in the NAND flash memory devices, which may originate from multiple disparate applications running on one or more hosts. A NAND flash memory device may only be processing a single I/O operation at any one time and a memory bus/channel connecting multiple NAND flash devices to a memory controller may only be transferring data for a single memory device at any one time. Traditionally, a host application attempting to read data from, or write data to, an SSD therefore typically experiences varying levels of latencies due to having to share access to the memory devices with other applications. Furthermore, because the I/O activities of different applications are typically not synchronized or related, the latencies as experienced by a single application are unpredictable. In an example in which a host resides within a datacenter having a large number of SSDs and hosts running multiple disparate applications to store and retrieve data, the host has no control over the unpredictable latencies of the SSDs when requesting the SSDs to perform I/O operations for an application, due to the simultaneous and unconnected activities of other hosts and applications. The host experience can further deteriorate in the scenario where the host is running time-sensitive applications (e.g., real-time data gathering, real-time data distribution, and so on) on the SSDs.

In an attempt to limit the effect of one application having a deleterious effect of the I/O latencies experienced by another, the NVM Express™ v1.4 base protocol specification for non-volatile memory storage introduced the concept of an "non-volatile memory (NVM) set" where the non-volatile storage was divided into separately addressable regions. These regions were logically and/or physically separate areas of memory, which enabled separate host applications to exclusively access separate areas of memory without having to share memory resources with each other. However, there remains the need for a NAND flash memory controller in an SSD to have the capability to handle the I/O from multiple disparate host applications to multiple NVM sets deterministic and predictable I/O latencies (also referred to as I/O Determinism, IOD) for the host applications and improving the experience of the host applications with respect to I/O operations on the SSD.

SUMMARY

In certain aspects, the present implementations of a SSD device are directed to systems and methods for providing transfer and processing units to support IOD features of the SSD device.

BRIEF DESCRIPTION OF THE FIGURES

FIG. 4C is a block diagram illustrating an example die having generic or stream configurations, according to some implementations.

FIG. 6 is a flow diagram illustrating an example process for defining a transfer and processing unit, according to some implementations.

DETAILED DESCRIPTION

Figure 1A:
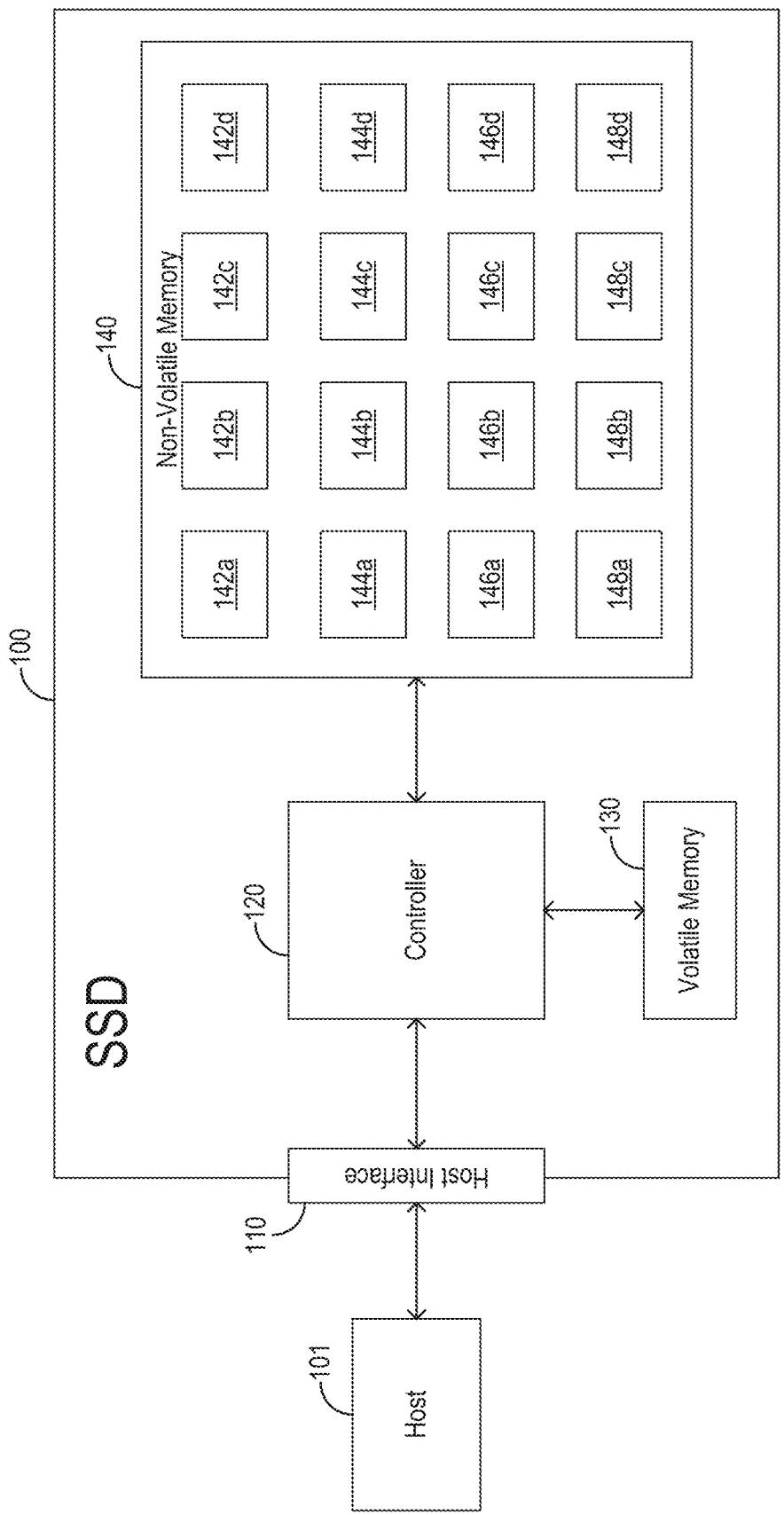
FIG. 1A shows a block diagram of an example SSD, according to some implementations.

Among other aspects, IOD drives refer to SSDs that implement IOD features as described herein. A physical space of an IOD drive is physically partitioned into various regions or isolation regions ("islands") of storage spaces referred to as NVM sets. The physical partitioning can be performed by physical blocks and/or dies of the NAND flash memory devices of the IOD drive. Each NVM set is logically managed to be independent of the logics of other NVM sets of the IOD drive. That is, each physical partition of the IOD drive is mapped to a logical partition of the IOD drive. The IOD drive can independently manage the logics performed on each NVM set and allocate the appropriate storage space and I/O bandwidth to each NVM set. I/O operations with respect to a NVM set are guaranteed a certain level of bandwidth from the NVM set, independent of the other NVM sets, thus allowing latencies to be predictable to the host as the host is aware of the guaranteed bandwidth. The host can therefore execute storage and compute functions using the IOD drives with the expectation of the guaranteed bandwidth, which can always be fulfilled due to the characteristics of IOD drives. Example architectures of the IOD drives can be found in U.S. Patent Pub. No. US 2019/0042150, titled "SSD ARCHITECTURE SUPPORTING LOW LATENCY OPERATION," filed on Nov. 1, 2017, which is hereby incorporated by reference in its entirety.

In a so-called "noisy neighbor" scenario of a regular, non-IOD, SSD, the I/O operations of a first application may affect the operations and the latencies experienced by a second application. With an IOD drive, even though the first application executed by the host pertains to the I/O operations on the first NVM set and not the second NVM set, the "noisy neighbor" phenomenon may yet be caused by improper physically partitioning of the IOD drive. In addition, although the non-volatile memory of an IOD drive may be partitioned physically and logically into multiple NVM sets, the controller that performs and controls the logical functions may cause delays for the I/O operations of one NVM set of the IOD drive due to the I/O operations of another NVM set of the IOD drive, due to the sharing of compute and/or hardware resources between the NVM sets by the controller. As such, a controller that logically manages multiple NVM sets of the IOD drive may become a bottleneck for I/O operations of the multiple NVM sets, thus still contributing to the "noisy neighbor" phenomenon in spite of the physical partitioning of the non-volatile storage allocated to NVM sets in an IOD drive.

A process flow within a controller used to perform I/O operations of an IOD drive is referred to as an I/O path. In some cases, the I/O path includes multiple control flows and communications between multiple processes, often on multiple processors, and/or controllers. The I/O path includes a host on one end of the I/O path, the NAND flash memory devices on the other end of the I/O path, and multiple processes and/or processors between the host and the NAND flash memory devices. The communication between the processes and/or processors can be aided by inter-process communications (IPCs), each of which corresponds to a communication link between two processes/processors that are in communication with one another. Multiple message types can be transferred on IPCs between the processes. For an IOD drive, before data is written to or read from the NAND flash memory devices of the IOD drive, the IPCs carry messages of each NVM set in the I/O path. While a number of processors and processes may remain the same on the controller, IPC infrastructure and scheduling of traditional firmware result in collisions and resource bottlenecks between multiple NVM sets of the IOD drive.

Traditional IPC schemes used in non-IOD drives are unfit for implementation on the IOD drives as those IPC schemes lack the capabilities to avoid resource contention and inverted priorities between IPC messages of a same type, where the IPC messages belong to multiple NVM sets. In an example in which a processor is currently handling IPC S0-A of NVM set-0, and the processor receives IPC S1-A from NVM set-1 while the processor is handling IPC S0-A and receives IPC S2-A from NVM set-2 after S1-A is received, S0-A, S1-A, and S2-A will be handled on the processor in that order according to traditional IPC schemes. S0-A, S1-A, and S2-A are of a same message type and are handled by the same processor. If the NAND flash memory devices are busy on NVM set-0 or controller resources for NVM set-0 are unavailable, processing S0-A would take longer. The long processing time of S0-A can further delay processing of S1-A and S2-A because S0-A, S1-A, and S2-A are processed sequentially in that order. Accordingly, the traditional IPC schemes increases latencies on IPC messages of NVM set-1 and NVM set-2 due to traffic conditions on NVM set-0, thus contributing to the "noisy neighbor" phenomenon. This problem is compounded by the significant number of processes and control paths within the controller for the I/O operations.

In some examples, the processors used to handle messages are common to all NVM sets. That is, a same processor can handle messages of a same type for all NVM sets or messages corresponding to a same task for all NVM sets. The firmware on an IOD drive can generate and prepare messages. In a controller, each message corresponds to a transfer and processing unit and is communicated via the IPCs and the independent data lanes in the manner described. Different customers may require different drive configurations. For example, one customer may demand a traditional, non-IOD drive (also referred to as a "vanilla" drive or a "generic" drive) while other customers may demand IOD drives having different IOD NVM set configurations (e.g., different numbers of NVM sets, and so on). If the definition of the transfer and processing units is not scalable to address the customer demand for selecting from traditional, non-IOD drive configurations and different IOD NVM set configurations, developing multiple different custom firmware (each custom firmware corresponding to a different set of configurations) is required. This leads to higher costs and higher complexities for implementing IOD drives.

Furthermore, the transfer and processing unit size being incompatible to or suboptimal for NAND and flash controller operations can lead to diminished NAND throughput given that redundant operations are being executed on the controller and the NAND. For instance, a transfer and processing unit that is too large requires more CPU cycles to process, and thus has a longer processing time for each NVM set. The long processing time can lead to potential bottlenecks that result in other NVM sets that share the controller resources (e.g., the processors) experiencing worsened latencies.

Embodiments disclosed herein relate to systems, apparatuses, methods, and non-transitory computer readable media for providing a low-latency IPC scheme implemented on a controller of a drive capable of IOD features. The IPC scheme is implemented to connect processes, processors, hardware, the controller, the host, and the NAND flash memory devices of the drive. Firmware is configured to establish and manage an independent data lane for each NVM set of the IOD drive. Each independent data lane includes one or more IPCs and associated handlers. The firmware is configured to define a transfer and processing unit (also referred to herein as an optimal transfer and processing unit (OTPU)). Each message is communicated in an OTPU over the independent data lanes.

In some implementations, an IOD drive implementing the independent data lanes and the OTPUs can provide predictable latency for SSD, for example, by avoiding I/O conflicts and overheads among different NVM sets of the IOD drive. In some embodiments, IOD drives can ensure that the traffic profile and the load on one NVM set do not affect latencies on other NVM sets that are within a same drive (e.g., a same SSD). That is, the IOD drive is configured to prevent the "noisy neighbor" phenomenon by isolating each configured NVM set in the controller. That is, in addition to the physical NAND partitions that create isolated regions (for isolating NAND operations for each NVM set), the SSD firmware can be configured to ensure that the I/O handling within a controller is isolated for each IOD NVM set by being capable of providing an independent data lane for each NVM set of the SSD.

In addition, the implementation of the OTPUs within the controller can result in low-latency communications between the processes and processors of the controller while providing scalable, flexible transfer and processing units configured for improved NAND and flash controller throughput. The same firmware can provide different configurations for an SSD, including non-IOD, generic configurations, different IOD NVM set configurations, stream configurations, and so on. The controller can build and link multiple OTPUs (having a same size) to suit drive configurations and data arrangement on a non-volatile memory (e.g., NAND) of the SSD without preparing a custom firmware for each set of configurations. Such implementations are long-term solutions for various emerging NAND generations and associated parameters, controller designs, and hyper-scalar customer requirements.

FIG. 1A is a block diagram of a structure of an SSD 100, according to some implementations. As shown in FIG. 1A, a controller 120 is in communication with a host 101 through a host interface 110. The host 101 can be one or more one or more host devices or host applications. The host 101 can include any suitable device such as but not limited to, a computing device, storage appliance, and so on. In some examples, the host 101 can be a user device operated by a user. In some implementations, the host 101 and the SSD 100 reside in a datacenter (not shown). The datacenter includes a plurality of platforms, each of which can support a plurality of hosts (such as but not limited to, the host 101) and SSD devices (such as but not limited to, the SSD 100).

The SSD 100 includes a volatile memory 130 and a non-volatile memory 140. The volatile memory device 130 and the non-volatile memory 140 are in communication with the controller 120.

In some implementations, the non-volatile memory 140 can be an array of non-volatile memory dies as shown. The non-volatile memory 140 includes non-volatile memory dies 142a-142d, 144a-144d, 146a-146d, and 148a-148d, which can be arranged in one or more memory communication channels connected to the controller 120. For example, dies 142a-d may be configured on one memory channel, dies 144a-d on another, and so on. While the 16 non-volatile memory dies 142a-142d, 144a-144d, 146a-146d, and 148a-148d are shown in FIG. 1A, the non-volatile memory 140 of the SSD 100 can include any suitable number of non-volatile memory dies that are arranged in one or more channels in communication with the controller 120.

In one implementation, the non-volatile memory dies 142a-142d, 144a-144d, 146a-146d, and 148a-148d includes NAND flash memory. The NAND flash memory includes flash memory. For example, each NAND flash memory device includes one or more individual NAND flash dies, which are non-volatile memory devices capable of retaining data without power. Each of the non-volatile memory dies 142a-142d, 144a-144d, 146a-146d, and 148a-148d has one or more planes. Each plane has multiple blocks, and each block has multiple pages. Data may be written to the pages in a block in consecutive order, once all the pages are written no more data is written until the block is erased, whereupon the pages can be written with new data in consecutive order again, and so on.

In some implementations, the volatile memory device 130 includes a volatile memory DRAM buffer. The volatile memory device 130 can be a single device of a unitary type or multiple devices of different types capable of providing a volatile memory buffer for the SSD 100.

The controller 120 can combine raw data storage in the non-volatile memory dies 142a-142d, 144a-144d, 146a-146d, and 148a-148d such that those non-volatile memory dies 142a-142d, 144a-144d, 146a-146d, and 148a-148d function like a single storage. The controller 120 can include microcontrollers, buffers, error correction functionality, flash translation layer (FTL), flash interface layer (FTL), flash controllers, flash management layer software, address mapping table, and firmware for implementing such functions as further described herein. In some arrangements, the software/firmware can be stored in the non-volatile memory 140 or in any other suitable computer readable storage medium.

The controller 120 includes suitable processing and memory capabilities for executing functions described herein, among other functions. For example, the controller 120 includes one or more processors (e.g., central processing units (CPUs)) for implementing the various functions of the SSD 100. As described, the controller 120 manages various features for the non-volatile memory dies 142a-142d, 144a-144d, 146a-146d, and 148a-148d including but are not limited to, I/O handling, reading, writing, erasing, monitoring, logging, error handling, garbage collection, wear leveling, logical to physical (L2P) address mapping, and the like.

Figure 1B:
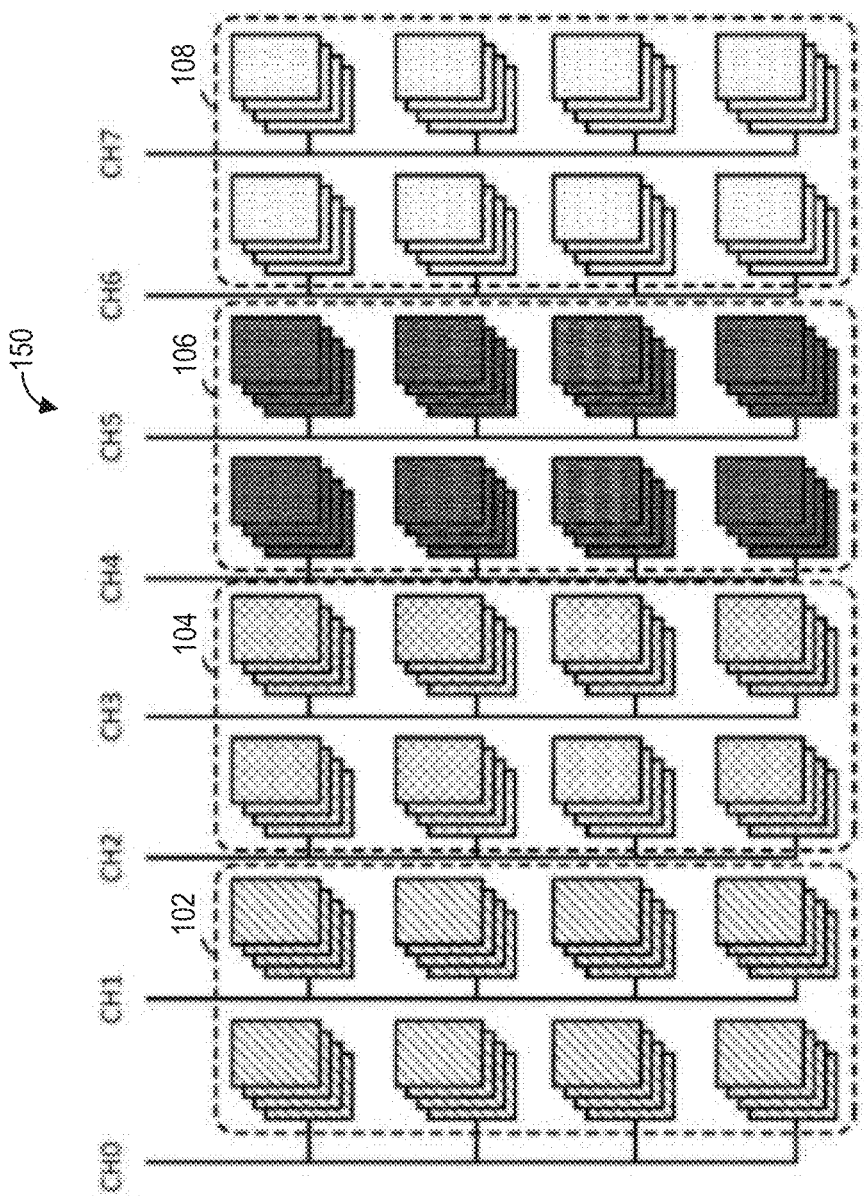
FIG. 1B is a block diagram of an SSD architecture supporting low latency operation, according to some implementations.

FIG. 1B is a block diagram of an SSD architecture 150 supporting low latency operation, according to some implementations. Referring to FIGS. 1A and 1B, the SSD architecture 150 can be configured from a non-volatile memory of a SSD such as but not limited to, the non-volatile memory 140. As shown in FIG. 1B, the SSD architecture 150 includes an array of 32 non-volatile memory dies are arranged across 8 channels (CH0-CH7), with 4 non-volatile memory dies coupled to each channel. In other words, the SSD architecture 150 includes an array of NAND flash memory devices. Each of the non-volatile memory dies has one or more planes. One of ordinary skill in the art can appreciate that any suitable number of dies can be operatively coupled to any suitable number of channels. Each of the non-volatile memory dies in the SSD architecture 150 can be one of the non-volatile memory dies 142a-142d, 144a-144d, 146a-146d, and 148a-148d. The channels CH0-CH7 can be a physical channel or a logical channel.

Rather than superblocks formed by selecting a physical block from each of the non-volatile memory dies across all 8 channels, the SSD architecture 150 includes superblocks formed by selecting all of the physical blocks from each of the non-volatile memory dies on the same channel and an adjacent channel (denoted by the same shading). Each of these superblocks forms an isolation region (e.g., a region that is isolated form other regions) within the SSD that is unaffected by channel I/O activities to other regions of the SSD, since each region is accessed via channels which are not shared with other regions. Each isolation region can be referred to as a NVM set. Thus, in the SSD architecture 150, an isolation region 102 includes the physical blocks of the non-volatile memory dies on the two channels CH0 and CH1. An isolation region 104 includes the physical blocks of the non-volatile memory dies on the two channels CH2 and CH3. An isolation region 106 includes the physical blocks of the non-volatile memory dies on the two channels CH4 and CH5. An isolation region 108 includes the physical blocks of the non-volatile memory dies on the two channels CH6 and CH7.

By configuring the superblocks using only the physical blocks from the non-volatile memory dies in a fixed number of separate channel(s) to form isolation regions, such as shown in FIG. 1B, I/O operation collisions at the non-volatile memory dies and the channel controllers can be minimized or avoided altogether, allowing for lower latency, greater predictability, and more consistent I/O performance of the SSD. As shown, each of the isolation regions 102-108 includes the non-volatile memory dies coupled to multiple (e.g., two) channels, thus leveraging multiple channel controllers per isolation region to handle host I/O operations to improve throughput per isolation region. Alternatively, an isolation region can include non-volatile memory dies coupled to one channel. Accordingly, the dies of the SSD architecture 150 can be selected and arranged to form the isolation regions 102-108, but in principle any number of channels may be used to form an isolation region, where separate isolation regions do not share channels.

While FIG. 1B illustrates that all dies operatively coupled to a same channel are in a same isolation region, other methods for forming isolation regions allow dies coupled to a same channel to be in separate isolation regions. For example, two dies from each of the channels CH0-CH3 can form a first isolation region while two other dies from each of the channels CH0-CH3 can form a second isolation region. A large number of channels per isolation region improves throughput of the isolation region, however when sharing channels between regions a compromise is made regarding isolation capability, since two regions which have unique dies yet share channels will not have as great a degree of isolation as regions which have completely separate channels.

Figure 2:
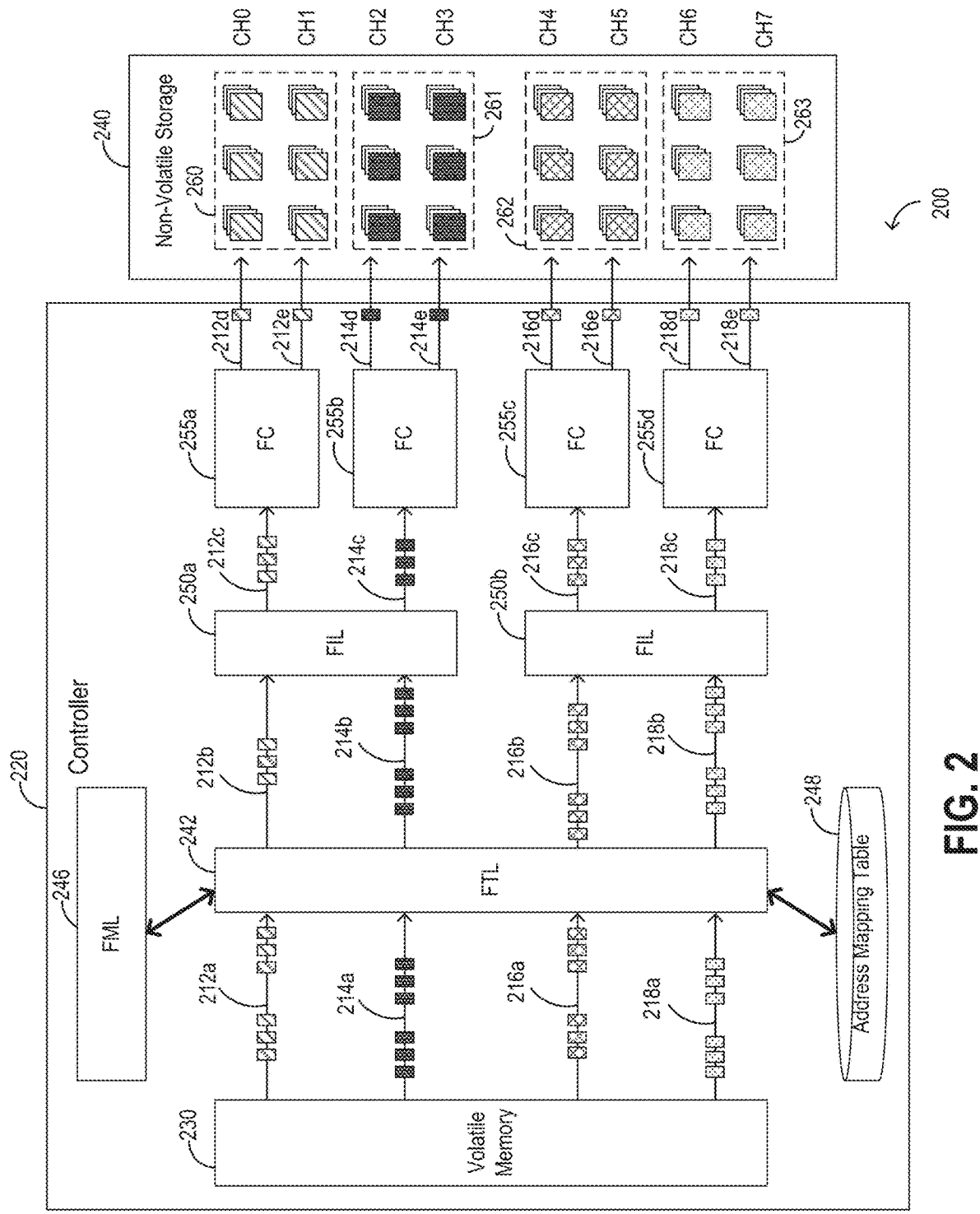
FIG. 2 is a block diagram of an SSD architecture including multiple independent data lanes, according to some implementations.

FIG. 2 is a block diagram of an SSD architecture 200 including multiple independent data lanes, according to some implementations. Referring to FIGS. 1A-2, the SSD architecture 200 includes a controller 220 and a non-volatile storage 240. The controller 220 can be an example implementation of the controller 120. The controller 220 includes a volatile memory 230, which can be a volatile memory such as but not limited to, the volatile memory 130. The non-volatile storage 240 can be a non-volatile memory such as but not limited to, the non-volatile memory 140 or a non-volatile memory having the architecture 150.

The non-volatile storage 240 includes an array of non-volatile memory dies that are arranged across 8 channels (e.g., CH0-CH7), with three non-volatile memory dies coupled to each channel. In other words, the non-volatile storage 240 includes an array of NAND flash memory devices. The channel connections to the individual dies are not shown for the sake of clarity. Each of the non-volatile memory dies has multiple planes. One of ordinary skill in the art can appreciate that any suitable number of dies can be operatively coupled to any suitable number of channels. The channels CH0-CH7 can be a physical channel or a logical channel.

The non-volatile memory dies of the non-volatile storage 240 form isolation regions (physically isolated regions) or NVM sets 260-263. The dies that belong to a same NVM set are denoted by the same shading. For example, the dies operatively coupled to the channels CH0 and CH1 form a NVM set 260. The dies operatively coupled to the channels CH2 and CH3 form a NVM set 261. The dies operatively coupled to the channels CH4 and CH5 form a NVM set 262. The dies operatively coupled to the channels CH6 and CH7 form a NVM set 263.

The controller 220 includes various processors configured to perform various processes of the controller 220. For example, a FTL processor 242 (e.g., a FTL interface module) can process an address mapping table 248 (e.g., a L2P mapping table). The address mapping table 248 is a mapping table that keeps records of the correspondence between logical addresses and physical addresses. For example, the address mapping table 248 can translate read and write commands (received from the host) with respect to logical blocks into low-level commands that reference physical blocks. In some examples, a read or write command received from the host includes at least a logical block address (LBA). The LBA is a logical address that identifies a logical block, which may be a region in a sector. In some examples, the write command can also include a number of regions/sectors to which the data is to be written. The address mapping table 248 stores mapping between each logical address and one or more physical addresses (e.g., pages of a memory die) where data of the logical address is stored.

The FTL processor 242 can perform L2P operations based on the address mapping table 248. For example, the FTL processor 242 can translate a LBA into a physical address, thus resolving the physical address corresponding to the LBA. Responsive to receiving a write or read command (containing a LBA therein) from the host, the FTL processor 242 can look up the physical address corresponding to the LBA by using the address mapping table 248 in order to write to or read from the physical address. The address mapping table 248 can be stored in one or more of the non-volatile storage 240, the volatile memory 230, or a suitable memory of the controller 220.

The controller 220 includes a flash management layer (FML) processor 246 in some implementations. The FML processor 242 manages the flash memory dies, arranges the blocks of memory within dies into optimal groups called Logical Blocks, determines the next Logical Block to be allocated for user data, the next to be selected for garbage collection and for metadata such as mapping look up tables. The FML also monitors the progress of write commands and prepares the next block for writing in advance and manage the triggers for checking of retention reliability of data previously stored.

The controller 220 includes flash interface layers (FIL) processors 250a and 250b in some implementations. The FIL processors 250a and 250b provide the interface between the FTL and the Flash Controllers (FC 255a/b and 255c/d respectively). The FIL processes incoming flash commands from the FTL in a command queue (not shown for clarity), scheduling them in an optimal fashion to the appropriate Flash Controller for the destination physical memory bank (die) for the command. Responses from the commands are handled from the FC and stored in response queue (not shown for clarity), indicating to the FTL the success or failure of the command. As shown, each of the FIL processors 250a and 250b is in the I/O path for two of the NVM sets 260-263. For example, the FIL processor 250a is in the I/O path for the NVM sets 260-261. The FIL processor 250b is in the I/O path for the NVM sets 262-263.

The controller 220 further includes flash controllers (FCs) 255a-255d in some implementations. The FCs 255a-255d take the memory commands from the FIL and schedule the commands on the individual memory channels, performing the necessary memory bus control signaling and data transfers to the memory dies and checking the memory die status for the success or failure of the commands. As shown, each of the NVM sets 260-263 has one different one of the FCs 255a-255d. For instance, the FC 255a is in the I/O path of the NVM set 260. The FC 255b is in the I/O path of the NVM set 261. The FC 255c is in the I/O path of the NVM set 262. The FC 255d is in the I/O path of the NVM set 263.

Each of the processors 242, 246, 250a-250b, and 255a-255d can be a separate processor (e.g., CPU), processing circuit, or microcontroller in some implementations. In other words, each of the processors 242, 246, 250a-250b, and 255a-255d refers to a separate hardware component that may remain unchanged post-manufacture. In alternative implementations two or more of the processors 242, 246, 250a-250b, and 255a-255d can be implemented on a same processor, processing circuit, or microcontroller. The controller 220 (including the processors 242, 246, 250a-250b, and 255a-255d, the volatile memory 230, and the address mapping table 248 (if stored in a memory of the controller)) can be implemented using hardware such as but not limited to, a system-on-chip (SoC). As described in further detail herein, the firmware on which the processors 242, 246, 250a-250b, and 255a-255d, the volatile memory 230, and the address mapping table 248 runs can be used to configure a given number of data lanes. The firmware handles and manages the non-volatile storage 240, the I/O operations, and the background operations of the SSD architecture 200.

An IPC is used for communications between two components (e.g., two processes running on processors) of the SSD architecture 200. An IPC corresponds to signaling over a communication link from a sender processor or process to a receiver processor or process. For instance, the IPC can provide communication protocols that allow communication of instructions, messages, and tasks between the sender processor or process and the receiver processor or process. Each of the instructions, messages, and tasks carries an indication of a task to be performed by the receiver processor or process and context identifiers or references to data used in the task. In some implementations, each IPC corresponds to configured software/firmware such as but not limited to, a software queue, a message queue, shared memory or a mailbox configured using a suitable protocol between the sender process and the receiver process. In some implementations, each IPC corresponds to a communication port established by the controller 220 for communications between the sender process, such as but not limited to, an internet protocol (IP) port or socket and the receiver process. Alternatively, each IPC is a physical communication link such as but not limited to, a bus (e.g., a peripheral component interconnect (PCI)), a physical IPC port, a serial communications link, a channel, and so on.

The firmware of the controller 220 can configure any suitable number of NVM sets from the dies in the non-volatile storage 240 and can configure a same number of independent data lanes. In other words, the firmware of the controller 220 can configure an independent data lane for each configured NVM set such that all instructions, messages, and tasks for that NVM set can be carried using the corresponding independent data lane, and the corresponding independent data lane does not carry any instruction, message, or task for another NVM set.

As shown, a first independent data lane is provided along the I/O path for the NVM set 260. The first independent data lane includes multiple IPCs/links 212a, 212b, 212c, 212d, and 212e. The IPC 212a is used to carry instructions, messages, and tasks from the volatile memory 230 to the FTL processor 242. The IPC 212b is used to carry instructions, messages, and tasks between the FTL processor 242 and the FIL processor 250a. The IPC 212c is used to carry instructions, messages, and tasks between the FIL processor 250a and the FC 255a. The link 212d is a flash memory channel used to carry commands/operations, data and messages, between the FC 255a and the dies of the NVM set 260 that are operatively coupled to the channel CH0. The link 212e is a flash memory channel used to carry commands/operations, data and messages between the FC 255a and the dies of the NVM set 260 that are operatively coupled to the channel CH1. The first independent data lane includes two links 212d and 212e from the FC 255a to the NVM set 260 in the non-volatile storage 240 given that the links between the FC 255a to the NVM set 260 are channel-specific. The first independent data lane carries the commands/operations, data and messages for only the NVM set 260 and not another NVM set.

A second independent data lane is provided along the I/O path for the NVM set 261. The first independent data lane includes multiple IPCs/links 214a, 214b, 214c, 214d, and 214e. The IPC 214a is used to carry instructions, messages, and tasks from the volatile memory 230 to the FTL processor 242. The IPC 214b is used to carry instructions, messages, and tasks between the FTL processor 242 and the FIL processor 250a. The IPC 214c is used to carry instructions, messages, and tasks between the FIL processor 250a and the FC 255b. The link 214d is a flash memory channel used to carry commands/operations, data, and messages between the FC 255b and the dies of the NVM set 261 that are operatively coupled to the channel CH2. The link 214e is a flash memory channel used to carry commands/operations, data, and messages between the FC 255b and the dies of the NVM set 260 that are operatively coupled to the channel CH3. The first independent data lane includes two links 214d and 214e from the FC 255b to the NVM set 261 in the non-volatile storage 240 given that the links between the FC 255b to the NVM set 261 are channel-specific. The second independent data lane carries the commands/operations, data, and messages for only the NVM set 261 and not another NVM set.

A third independent data lane is provided along the I/O path for the NVM set 262. The third independent data lane includes multiple IPCs/links 216a, 216b, 216c, 216d, and 216e. The IPC 216a is used to carry instructions, messages, and tasks from the volatile memory 230 to the FTL processor 242. The IPC 216b is used to carry instructions, messages, and tasks between the FTL processor 242 and the FIL processor 250b. The IPC 216c is used to carry instructions, messages, and tasks between the FIL processor 250b and the FC 255c. The link 216d is a flash memory channel used to carry commands/operations, data, and messages between the FC 255c and the dies of the NVM set 262 that are operatively coupled to the channel CH4. The link 216e is a flash memory channel used to carry commands/operations, data, and messages between the FC 255c and the dies of the NVM set 262 that are operatively coupled to the channel CH5. The third independent data lane includes links IPCs 216d and 216e from the FC 255c to the NVM set 262 in the non-volatile storage 240 given that the links between the FC 255c to the NVM set 262 are channel-specific. The third independent data lane carries the commands/operations, and messages for only the NVM set 262 and not another NVM set.

A fourth independent data lane is provided along the I/O path for the NVM set 263. The fourth independent data lane includes multiple IPCs/links 218a, 218b, 218c, 218d, and 218e. The IPC 218a is used to carry instructions, messages, and tasks from the volatile memory 230 to the FTL processor 242. The IPC 218b is used to carry instructions, messages, and tasks between the FTL processor 242 and the FIL processor 250b. The IPC 218c is used to carry instructions, messages, and tasks between the FIL processor 250b and the FC 255d. The link 218d is a flash memory channel used to carry commands/operations, data, and messages between the FC 255d and the dies of the NVM set 263 that are operatively coupled to the channel CH6. The link 218e is a flash memory channel used to carry commands/operations, data, and messages between the FC 255d and the dies of the NVM set 263 that are operatively coupled to the channel CH7. The fourth independent data lane includes two links 218d and 218e from the FC 255d to the NVM set 263 in the non-volatile storage 240 given that the links between the FC 255d to the NVM set 263 are channel-specific. The fourth independent data lane carries the commands/operations, and messages for only the NVM set 263 and not another NVM set.

The boxes shown along or in the IPCs 212a-212c, 214a-214c, 216a-216c, and 218a-218c refer to instructions, messages, and tasks carried in corresponding ones of the IPCs 212a-212c, 214a-214c, 216a-216c, and 218a-218c. The boxes having the same shading as that of a corresponding one of the NVM sets 260-263 refer to instructions, messages, and tasks related to the corresponding NVM set and not another NVM set.

While the processors 242, 246, 250a-250b, and 255a-255d and the storage devices 230 and 240 are shown as examples of entities such that an IPC and flash channels between two of those entities can be established for each NVM set, the IPC and-flash channels-per-NVM set scheme can be likewise be implemented for additional processors (e.g., the host interface 110) and storage devices.

As shown in FIG. 2, multiple IPCs each for a different one of the NVM sets 260-263 can be established via firmware between a sender process and a receiver process, instead of one IPC for all of the NVM sets 260-263. Given that each processor performs one or more dedicated functions (or "work" or "tasks"), multiple IPCs each for a different one of the NVM sets 260-263 are established for the same functions. As such, the SSD architecture 200 and particularly, the arrangement of the controller 220 reduce or prevent the bottleneck at the controller 220 that result from cramping messages, instructions, and tasks for multiple NVM sets in a same IPC. Accordingly, in the disclosed implementations, when delay occurs with respect to one of the NVM sets 260-263, only the data lane corresponding to the delayed NVM set is affected.

Examples of the independent data lanes for IOD drives are described in Ser. No. 16/523,925, titled "INDEPENDENT NVM set DATA LANES FOR IOD SSD," which is hereby incorporated by reference in its entirety.

A controller (e.g., the controller 120 or 220) can prepare messages (e.g., IPC messages, instructions, tasks, and so on). Each message corresponds to or is communicated in an OTPU. The OTPU is a transfer and processing unit (also referred to as an IPC processing unit) optimized to achieve low latency for communications over IPCs between the processors/processes of the controller. The OTPUs can be defined and scaled to suit drive configurations and data arrangements of the non-volatile memory such as but not limited to, the non-volatile memory 140, the non-volatile storage 240, and so on. In other words, the OTPUs can be defined based on the configurations and data arrangements of the memory hardware.

The controller can prepare messages with characteristics that can enable efficient processing of the messages and to provide low latency, in view of the processors of an IOD drive being shared such that a same processor can handle messages for all NVM sets. For example, the sizes of all OTPUs or messages are defined to be uniform (e.g., the same) to avoid inconsistent processing timing across NVM sets. In addition, the OTPUs or messages can be scalable for multiple sets of IOD NVM set configurations, including aggregation of channels and non-IOD, generic drive configurations. Moreover, the OTPUs or messages are compatible and optimal for NAND and FC operations. In some examples, the sizes of OTPUs can be uniform across SSDs having multiple different stock keeping units (SKUs), which have different numbers of dies and channels, among other differences. Still further, the OTPUs allow the processors/ processes to keep processing time short, therefore avoiding potential bottlenecks.

In some implementations, a data size of the OTPUs used for a non-volatile memory device having NAND flash memory devices can be defined using the following expression:

$$\text{Size}_{IPC} = N \times C \times P \qquad (1).$$

N is a size of a NAND page on the non-volatile memory, C is a number of interface channels operatively coupled to each FC (e.g., the number of interface channels per FC), and P is a number of planes on each NAND die of the non-volatile memory. In some implementations, a controller (e.g., the controller 220) typically has multiple FCs (e.g., the FCs 255a-255d) independently controlling sets of NAND Dies. For example, in the SSD architecture 200, C is 2. An OTPU that uses all flash channels of a controller can optimize the FC usage and overall drive efficiency. The number of channels controlled by a FC typically depends on the controller design, and therefore is a parameter considered in calculating the optimal size of the OTPU. Furthermore, the OTPUs can be communicated via all channels coupled to each FC to a NVM set of the non-volatile memory.

Figure 3:
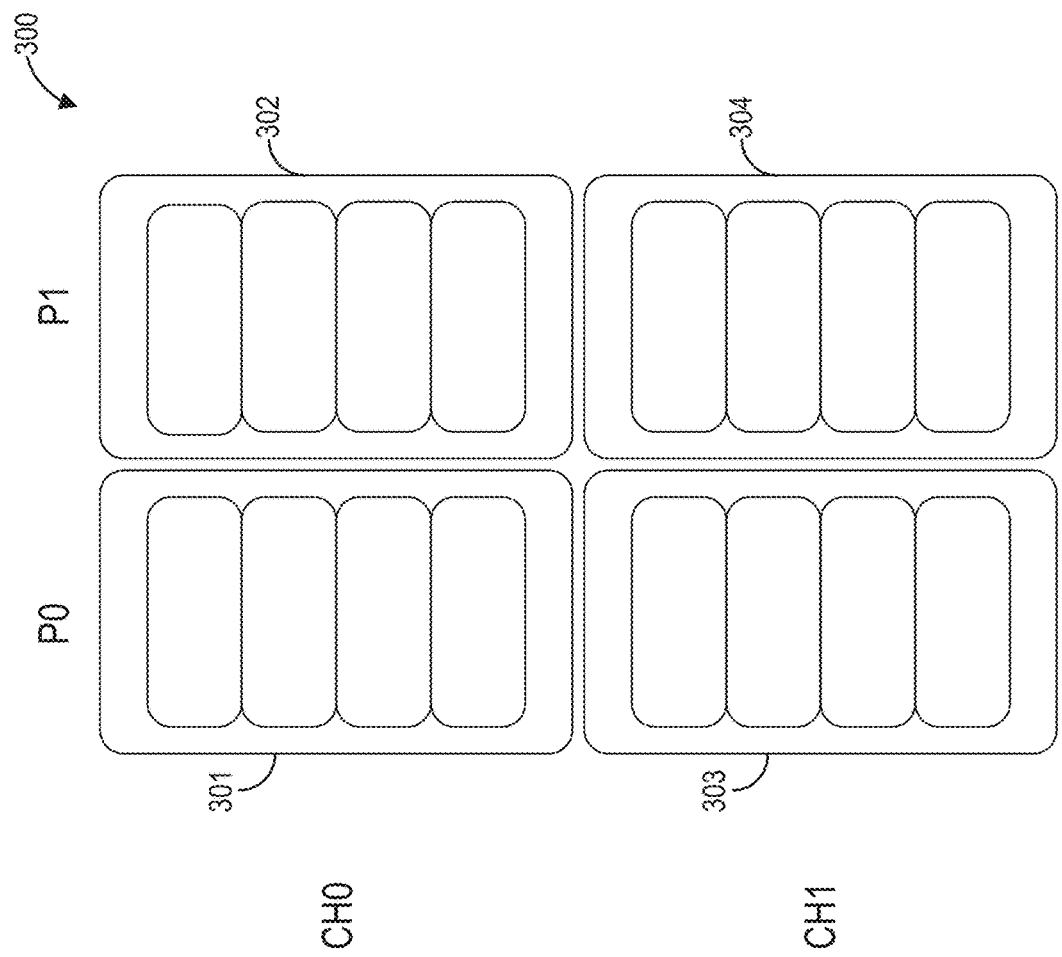
FIG. 3 is a block diagram illustrating an example transfer and processing unit, according to some implementations.

FIG. 3 is a block diagram illustrating an example transfer and processing unit (e.g., an OTPU 300), according to some implementations. Referring to FIGS. 1A-3, the size of the OTPU 300 can be determined by a controller, for example, using expression (1). As shown, the non-volatile memory for which the OTPU 300 is defined includes two interface channels (e.g., CH0 and CH1) operatively coupled to each FC of the controller, and each NAND die of the non-volatile memory has two planes (e.g., P0 and P1). In one example, each NAND page of the non-volatile memory is 16 KB, the size of the OTPU 300 is 64 KB. In another example, each NAND page of the non-volatile memory is 16 KB, and each NAND die of the non-volatile memory has four planes (e.g., P0-P4), the size of the OTPU 300 is 128 KB. The OTPU 300 has a size corresponding to 4 NAND pages 301-304. As described, the firmware processors/processes communicate messages in terms of an OTPU such as but not limited to, the OTPU 300 over IPCs across all processors of the controller. The OTPUs for a NVM set of the non-volatile memory are communicated via an independent data lane corresponding to that NVM set.

In some implementations, the OTPUs (e.g., the OTPU 300) can function as building blocks that can be assembled and interlocked in various suitable manners to construct data on an SSD drive for any SSD configurations such as but not limited to, generic, non-IOD configurations, IOD configurations, streams configurations, and so on. The OTPUs can be scaled for any SKU with varying channel and die configurations. The OTPUs can be implemented for any generation of NAND flash memory devices, including triple level cells (TLCs), quad-level cells (QLCs), and so on.

Figure 4A:
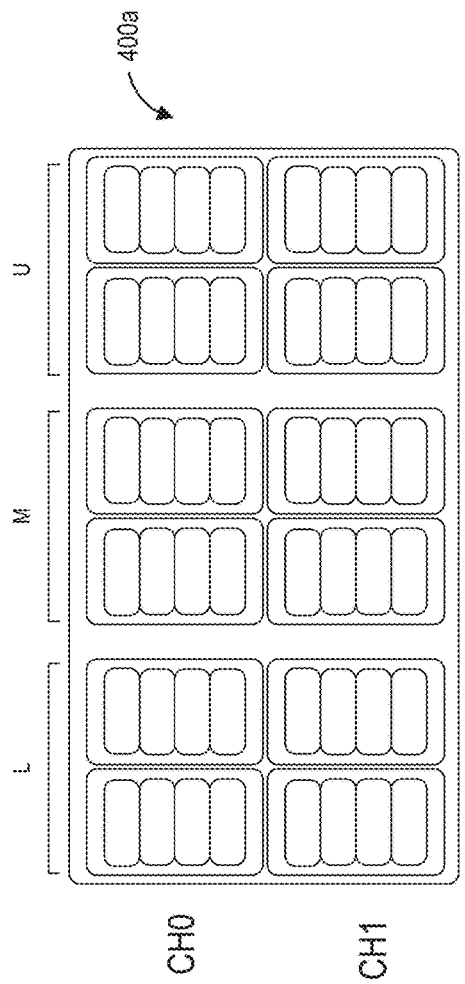
FIG. 4A is a block diagram illustrating an example die having a triple level cell (TLC) structure, according to some implementations.

FIG. 4A is a block diagram illustrating an example die 400a having the TLC structure, according to some implementations. Referring to FIGS. 1A-4A, multiple OTPUs 300 can be assembled and interlocked to construct data on the TLC die 400a. The TLC die 400a has three levels, a lower level (denoted by "L"), a middle level (denoted by "M"), and an upper level (denoted by "U"). The TLC die 400a has two channels (e.g., CH0 and CH1) operatively coupled to each FC of a controller. The size of each of the lower level L, the middle level M, and the upper level U of the TLC die 400a corresponds to the size of the OTPU 300. Therefore, three OTPUs 300 can be assembled and interlocked to construct data on the TLC die 400a, without needing any additional fraction of an OTPU.

Figure 4B:
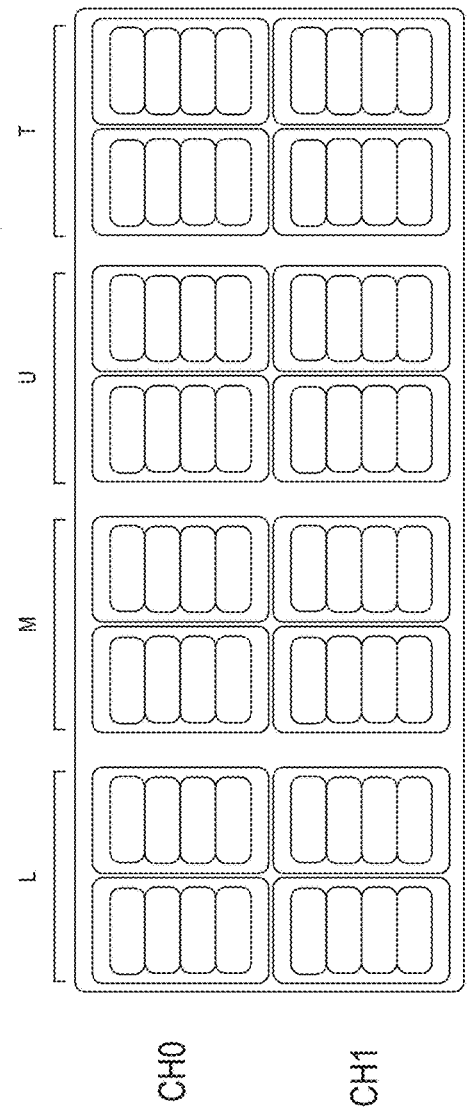
FIG. 4B is a block diagram illustrating an example die having a quad-level cell (QLC) structure, according to some implementations.

FIG. 4B is a block diagram illustrating an example die 400b having the QLC structure, according to some implementations. Referring to FIGS. 1A-4B, multiple OTPUs 300 can be assembled and interlocked to construct data on the QLC die 400b. The QLC die 400b has four levels, a lower level (denoted by "L"), a middle level (denoted by "M"), an upper level (denoted by "U"), and a top level (denoted by "T"). The QLC die 400b has two channels (e.g., CH0 and CH1) operatively coupled to each FC of a controller. The size of each of the lower level L, the middle level M, the upper level U, and the top level T of the QLC die 400*b* corresponds to the size of the OTPU 300. Therefore, four OTPUs 300 can be assembled and interlocked to construct data on the QLC die 400*b*, without needing any additional fraction of an OTPU.

FIG. 4C is a block diagram illustrating an example die 400*c* having generic or stream configurations, according to some implementations. Referring to FIGS. 1A-4C, multiple OTPUs 300 can be assembled and interlocked to construct data on the die 400*c*, without needing any additional fraction of an OTPU. The die 400*c* has three levels, a lower level (denoted by "L"), a middle level (denoted by "M"), and an upper level (denoted by "U"). The die 400*c* has eight channels (e.g., CH0-CH7). Two channels are operatively coupled to each FC of a controller. The size of each of the lower level L, the middle level M, and the upper level U of the die 400*c* corresponds to the size of multiple (e.g., four) OTPUs 300.

Figure 4D:
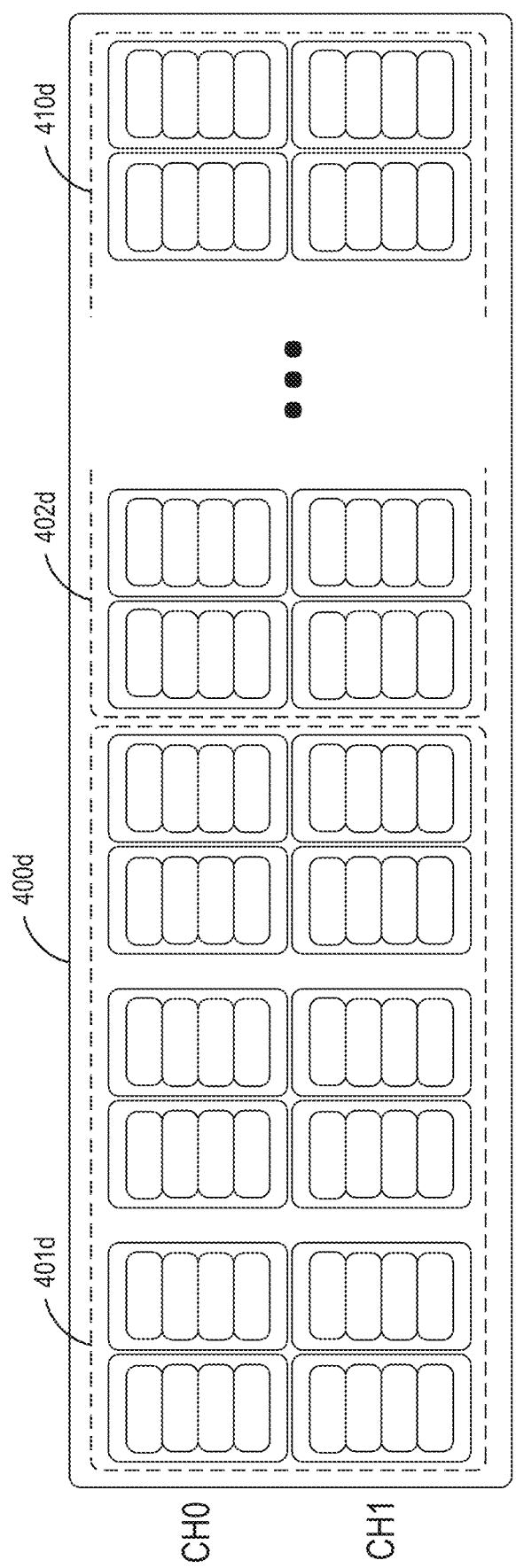
FIG. 4D is a block diagram illustrating an example IOD NVM set, according to some implementations.

FIG. 4D is a block diagram illustrating an example IOD NVM set 400*d*, according to some implementations. Referring to FIGS. 1A-4D, multiple OTPUs 300 can be assembled and interlocked to construct data on the IOD NVM set 400*d*, without needing any additional fraction of an OTPU. The IOD NVM set 400*d* includes multiple dies such as but not limited to, die 401*d*, die 402*d*, . . . , die 410*d*. Each of the dies 401*d*-410*d* has a size of multiple (e.g., three) OTPUs 300. The IOD NVM set 400*d* has two channels (e.g., CH0 and CH1). Two channels are operatively coupled to an FC of a controller. The IOD NVM set 400*d* can be a NVM set similar to the NVM set 260. The size of the IOD NVM set 400*d* corresponds to the size of multiple OTPUs 300.

Figure 5:
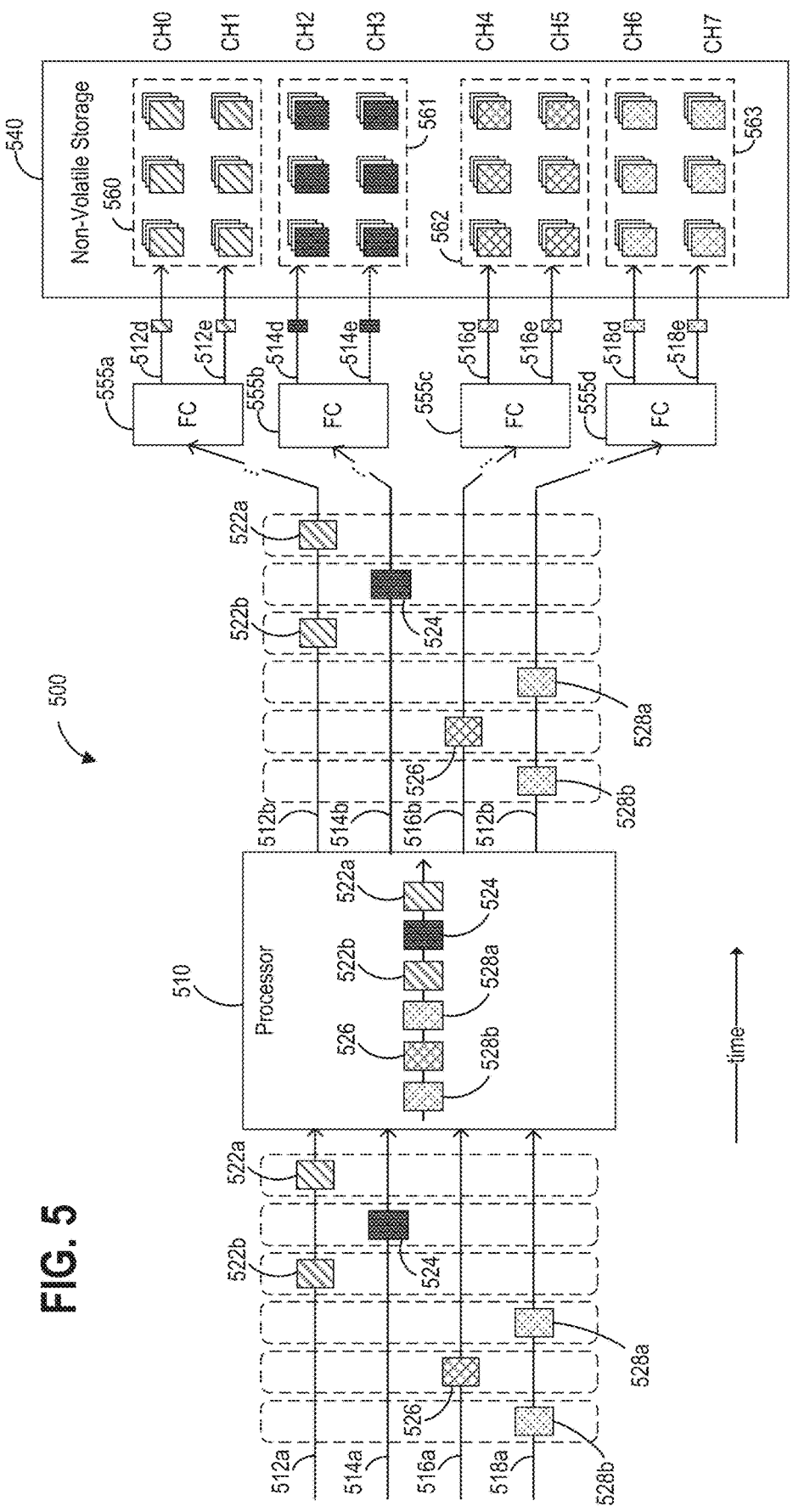
FIG. 5 is a block diagram illustrating communications within a controller using OTPUs, according to some implementations.

FIG. 5 is a block diagram illustrating communications within a controller 500 using OTPUs 522*a*, 522*b*, 524, 526, 528*a*, and 528*b*, according to some implementations. Referring to FIGS. 1A-5, the controller 220 is operatively coupled to a non-volatile storage 540. The controller 500 can be an example implementation of the controller 120. The non-volatile storage 540 can be a non-volatile memory such as but not limited to, the non-volatile memory 140 or 240 or a non-volatile memory having the architecture 150.

The non-volatile storage 540 includes an array of non-volatile memory dies that are arranged across 8 channels (e.g., CH0-CH7), with three non-volatile memory dies coupled to each channel and each die coupled to two channels. In other words, the non-volatile storage 540 includes an array of NAND flash memory devices. The channel connections are not shown for the sake of clarity. Each of the non-volatile memory dies has multiple planes. One of ordinary skill in the art can appreciate that any suitable number of dies can be operatively coupled to any suitable number of channels and any number of channels coupled to each die. The channels CH0-CH7 can each be a physical channel or a logical channel.

The non-volatile memory dies of the non-volatile storage 540 form isolation regions (physically isolated regions) or NVM sets 560-563. The dies that belong to a same NVM set are denoted by the same shading. For example, the dies operatively coupled to the channels CH0 and CH1 form a NVM set 560. The dies operatively coupled to the channels CH2 and CH3 form a NVM set 561. The dies operatively coupled to the channels CH4 and CH5 form a NVM set 562. The dies operatively coupled to the channels CH6 and CH7 form a NVM set 563.

The controller 500 includes various processors configured to perform various processes of the controller 500. For example, a processor 510 can be any suitable processor such as but not limited to, the processor 242, 246, 250*a*, 250*b*, or another suitable processor/process.

Similar to the firmware of the controller 220, the firmware of the controller 500 can configure any suitable number of NVM sets from the dies in the non-volatile storage 540 and can configure a same number of independent data lanes. In other words, the firmware of the controller 220 can configure an independent data lane for each configured NVM set.

As shown, a first independent data lane is provided along the I/O path for the NVM set 560. The first independent data lane includes IPCs 512*a*, 512*b*, 512*d*, 512*e* and one or more IPCs not shown. Two IPCs 212*d* and 212*e* linking the FC 555*a* to the NVM set 560 are provided given that the links between the FC 555*a* to the NVM set 560 are channel-specific. The first independent data lane carries the messages for only the NVM set 560 and not another NVM set.

A second independent data lane is provided along the I/O path for the NVM set 561. The second independent data lane includes IPCs 514*a*, 514*b*, 514*d*, 514*e* and one or more IPCs not shown. Two IPCs 214*d* and 214*e* linking the FC 555*b* to the NVM set 561 are provided given that the links between the FC 555*b* to the NVM set 561 are channel-specific. The second independent data lane carries the messages for only the NVM set 561 and not another NVM set.

A third independent data lane is provided along the I/O path for the NVM set 562. The third independent data lane includes IPCs 516*a*, 516*b*, 516*d*, 516*e* and one or more IPCs not shown. Two IPCs 216*d* and 216*e* linking the FC 555*c* to the NVM set 562 are provided given that the links between the FC 555*c* to the NVM set 562 are channel-specific. The third independent data lane carries the messages for only the NVM set 562 and not another NVM set.

A fourth independent data lane is provided along the I/O path for the NVM set 563. The fourth independent data lane includes IPCs 518*a*, 518*b*, 518*d*, 518*e* and one or more IPCs not shown. Two IPCs 218*d* and 218*e* linking the FC 555*d* to the NVM set 563 are provided given that the links between the FC 555*d* to the NVM set 563 are channel-specific. The fourth independent data lane carries the messages for only the NVM set 563 and not another NVM set.

The boxes shown along or in the IPCs 512*a*-512*e*, 514*a*-514*e*, 516*a*-516*e*, and 518*a*-518*e* refer to messages (e.g., instructions, tasks, and so on) carried in corresponding ones of the IPCs 512*a*-512*e*, 514*a*-514*e*, 516*a*-516*e*, and 518*a*-518*e*. The boxes having the same shading as that of a corresponding one of the NVM sets 260-263 refer to messages related to the corresponding NVM set and not another NVM set. Some of the messages can be prepared as OTPUs as described herein, e.g., using expression (1).

For example, messages for the NVM set 560 are prepared as OTPUs 522*a* and 522*b* and received by the processor 510 via the IPC 512*a*. A message for the NVM set 561 is prepared as OTPU 524 and received by the processor 510 via the IPC 514*a*. A message for the NVM set 562 is prepared as OTPU 526 and received by the processor 510 via the IPC 516*a*. Messages for the NVM set 563 are prepared as OTPUs 528*a* and 528*b* and received by the processor 510 via the IPC 518*a*. The processor 510 can receive the OTPUs 522*a*, 522*b*, 524, 526, 528*b*, and 528*b* at different times and push the OTPUs 522*a*, 522*b*, 524, 526, 528*b*, and 528*b* at different times. The dashed vertical boxes around the OTPUs 522*a*, 522*b*, 524, 526, 528*b*, and 528*b* are used to illustrate with clarity that the OTPUs 522*a*, 522*b*, 524, 526, 528*b*, and 528*b* are received and pushed out at different times along the time axis. In the example shown, the processor 510 receives the OTPUs 522*a*, 524, 522*b*, 528*a*, 526, and 528*b* in that order. The processor 510 can queue the OTPUs 522*a*, 524, 522*b*, 528*a*, 526, and 528*b* to be processed one at a time in some implementations. The order in which the processor 510 processes the OTPUs 522*a*, 524, 522*b*, 528*a*, 526, and 528*b* is the order in which the OTPUs 522*a*, 524, 522*b*, 528*a*, 526, and 528*b* are received. That is, the processor 510 process the OTPUs 522*a*, 524, 522*b*, 528*a*, 526, and 528*b* in that order. The processor 510 can implement a fair share scheduler for scheduling the OTPUs 522*a*, 524, 522*b*, 528*a*, 526, and 528*b* to be processed in that order. As shown, the processor 510 pushes out the OTPUs 522*a*, 524, 522*b*, 528*a*, 526, and 528*b*, in that order, to another processor (not shown) of the controller 500. Further examples of scheduling and processing the messages and the OTPUs are described in Ser. No. 16/523,948, titled "TWO-LAYERED DETERMINISTIC INTER-PROCESS COMMUNICATION SCHEDULER FOR INPUT OUTPUT DETERMINISM IN SOLID STATE DRIVES," which is hereby incorporated by reference in its entirety.

FIG. 6 is a flow diagram illustrating an example process 600 for defining a transfer and processing unit, according to some implementations. Referring to FIGS. 1A-6, the process 600 can be implemented by the firmware of the controller 120, 220, or 500. The hardware components (e.g., the processors/storages 230, 242, 246, 248, 250*a*, 250*b*, 255*a*-255*d*, 510, 555*a*-555*d* and so on provided on a SoC) regardless of number or function, remain unchanged once manufactured. The firmware controlling the hardware can define the OTPUs, for the same hardware, for a generic, non-IOD SSD configuration, an IOD SSD solution, a streams configuration, and so on. As such, given that SSD products may require IOD, streams, and non-IOD solutions, the same hardware is configurable through the firmware post-manufacture to define the OTPUs in the manner described.

At 610, an SSD (e.g., a controller thereof) executes a first power-on sequence. The first power-on sequence is the very first power-on sequence for the SSD post-manufacturing, and that no other power-on sequences have been executed before the first power-on sequence. The OTPUs are defined during the first power-on sequence in some implementations. In other implementations, the OTPUs are defined at another time.

At 620, the controller defines OTPUs for communicating messages for a plurality of NVM sets of a non-volatile memory of the SSD, for example, based on characteristics of the non-volatile memory of the SSD. In some implementations, the characteristics of the non-volatile memory include NAND geometry and NAND type. The NAND geometry includes at least one of a size of NAND pages in the non-volatile memory, a number of planes on each NAND die of the non-volatile memory, or one or more other suitable parameters characterizing the NAND geometry. The NAND type includes a number of interface channels operatively coupled to each flash controller of the non-volatile memory and/or one or more other suitable parameters characterizing the NAND type. In some implementations, the sizes of the OTPUs defined for the controller are uniform. The size of the OTPUs can be defined, for example, using expression (1).

The characteristics of the non-volatile memory can be determined by reading device configurations. For example, the controller can read the device configuration file for the SSD during the first power-on sequence to set up the SSD, including defining the OTPUs. The characteristics of the non-volatile memory can be stored in the device configuration file at the time of manufacture. The device configuration file can be stored in any suitable memory device of the controller or can be received from another device. In some implementations, during the first power-on sequence, the controller can further determine and enable a number of IOD NVM sets or streams, a same number of independent data lanes, and an order of data placement on the NAND flash memory devices of the non-volatile memory.

As described, the messages contained in the OTPUs are communicated among all modules of the controller firmware, where the modules are executed on multiple processors of the controller. Each of the OTPUs can further include attributes used to prepare and carry the OTPUs across all modules, processors, and processes, for example, to prepare data to be programmed on the NAND flash memory devices, to allow data to be read from the NAND flash memory devices, and so on. Such attributes can be defined at block 620.

In some examples, each OTPU includes a unique identifier that uniquely identifies each OTPU within the controller. In other words, no two OTPUs within the controller have the same identifier. In some examples, the unique ID of an OTPU can be communicated over one or more IPCs to and from various modules, processors, and processes, such that the modules, processors, and processes can refer a common shared memory in which attributes of the OPTU are stored to access those attributes. This allows one firmware to be implemented for various configurations as described herein and avoids the issue of configuration variations among multiple custom firmware.

In some examples, each OTPU includes a NVM set identifier that identifies the NVM set for which the OTPU is being communicated. For instance, each of the OTPUs 522*a* and 522*b* includes a same NVM set identifier that identifies the NVM set 560. In some examples, each OTPU includes a stream identifier that identifies the stream for which the OTPU is being communicated. In some examples, each OTPU includes addresses of NAND pages that are spread across the channels and planes corresponding to the OTPU. NAND pages (as well as channels and planes thereof) corresponding to an OTPU (e.g., the OTPUs 522*a* and 522*b*) refers the NAND pages of a NVM set (e.g., the NVM set 560) for which the OTPU is being communicated. For example, each of the OTPUs 522*a* and 522*b* includes the addresses of the NAND pages spread across the channels CH0 and CH1 and the planes of the dies in the NVM set 560. In other words, each of the OTPUs 522*a* and 522*b* includes the addresses of the NAND pages of the NVM set 560. In some examples, each OTPU includes status information and/or condition information of the NAND pages corresponding to the OTPU. The status information and/or condition information indicate whether the NAND pages are available, whether the NAND pages are busy, whether the NAND pages are written with data, bad page status, page addresses, page program type (e.g., SLC or TLC), page position in parity frame, type of data expected on the page, and so on.

At 630, the controller communicates the messages for the NVM sets of the non-volatile storage using the OTPUs defined at 620. For example, each of the messages has the OTPU size. For example, the sizes of the messages/OTPUs are uniform across all NVM sets.

Accordingly, implementations described herein relate to firmware-managed definition of OTPUs within controller to achieve low-latency inter-process communication scheme to avoid the "noisy neighbor" effect in IOD drive, to address the issue of the controller contributing to collisions between the I/O of multiple NVM sets, which in turn contributes to I/O latencies even though the NAND is partitioned into isolated NVM sets.

The same firmware can provide for various different configurations of IOD SSDs and management of the I/O path for each IOD NVM set within a controller designed for a generic, non-IOD SSD. Such implementations allow scaling up of the design of the, dividing the controller resources (such as but not limited to, CPU, hardware components, memory, and so on) in a manner to as to avoid contention, which compromises the latency and performance for I/O workloads on any of the NVM sets.

The OTPU scheme can be extended for various solutions such as but not limited to, IOD solutions on QLC NAND and any future NAND products, drives with host-managed schemes that are a mix of IOD and streams, any drive that has multiple isolated partitions on NAND and demand latency improvements amongst the isolated partitions, and so on.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storages, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method for providing communications in a controller of a solid state drive (SSD), the method comprising:
    defining, by the controller, an optimal transfer and processing unit (OTPU) size for communicating messages for a plurality of non-volatile memory (NVM) sets of a non-volatile memory of the SSD, each of the plurality of NVM sets corresponding to one of a plurality of regions of the non-volatile memory, each of the plurality of regions comprising a plurality of dies, wherein the OTPU size for all messages communicated by the controller for the plurality of NVM sets are uniform, and wherein the controller defines a first OTPU size for a first configuration of the non-volatile memory, and a second different OTPU size for a second different configuration of the non-volatile memory; and
    communicating, by the controller, the messages for the plurality of NVM sets, each of the messages having the OTPU size.

2. The method of claim 1, wherein
    the non-volatile memory is an array of non-volatile memory dies or an array of NAND flash memory devices;
    each of the non-volatile memory dies has at least one plane;
    two or more of the non-volatile memory dies are coupled to a same channel of a plurality of channels; and
    each of the plurality of NVM sets comprises some of the non-volatile memory dies coupled to at least one of the plurality of channels.

3. The method of claim 1, wherein
    the messages are communicated via inter-process communications (IPCs); and
    each of the IPCs corresponds to a communication link between two processors of the controller.

4. The method of claim 1, wherein the OTPU size is defined by configuring firmware of the controller.

5. The method of claim 1, wherein defining the OTPU size is performed during a first power-on sequence of the SSD.

6. The method of claim 1, wherein the OTPU size is defined based on characteristics of the non-volatile memory.

7. The method of claim 6, wherein the characteristics of the non-volatile memory comprise NAND geometry and NAND type.

8. The method of claim 7, wherein the NAND geometry comprises at least one of:
    a size of NAND pages in the non-volatile memory; or
    a number of planes on each NAND die of the non-volatile memory.

9. The method of claim 7, wherein the NAND type comprises a number of interface channels operatively coupled to each flash controller of the non-volatile memory.

10. The method of claim 1, wherein
    a processor of the controller receives the messages in an order; and
    the processor processes the messages according to the order in which the messages are received.

11. The method of claim 1, wherein a first processor of the controller pushes the messages to a second processor of the controller according to the order in which the messages are received at the first processor.

12. The method of claim 1, further comprising defining, by the controller, OTPUs for communicating the messages.

13. The method of claim 12, wherein defining the OTPUs comprises defining a unique identifier that uniquely identifies each of the OTPUs within the controller.

14. The method of claim 12, wherein defining the OTPUs comprises defining a NVM set identifier that identifies one of the plurality of NVM sets for which each OTPU is being communicated.

15. The method of claim 12, wherein each of the OTPUs comprises addresses of NAND pages spread across channels and planes corresponding to each OTPU.

16. The method of claim 12, wherein each of the OTPUs comprises status information or condition information of the NAND pages corresponding to each OTPU.

17. The method of claim 1, wherein the first and second configurations include one or more of a size of NAND pages in the non-volatile memory, a number of planes on each NAND die of the non-volatile memory, and a number of interface channels operatively coupled to each flash controller of the non-volatile memory.

18. A method for providing communications in a controller of a solid state drive (SSD), the method comprising:
    defining, by the controller, an optimal transfer and processing unit (OTPU) size for communicating messages for a plurality of non-volatile memory (NVM) sets of a non-volatile memory of the SSD, each of the plurality of NVM sets corresponding to one of a plurality of regions of the non-volatile memory, each of the plurality of regions comprising a plurality of dies,
    wherein the OTPU size for the plurality of NVM sets are uniform, and
    wherein the OTPU size is defined based on a size of NAND pages in the non-volatile memory, a number of planes on each NAND die of the non-volatile memory, and a number of interface channels operatively coupled to each flash controller of the non-volatile memory; and
    communicating, by the controller, the messages for the plurality of NVM sets, each of the messages having the OTPU size.

19. The method of claim 18, wherein the OTPU size is the size of the NAND pages in the non-volatile memory multiplied by the number of the planes on each NAND die of the non-volatile memory multiplied by the number of interface channels operatively coupled to each flash controller of the non-volatile memory.

20. A Solid State Drive (SSD), comprising:
    a non-volatile memory having a plurality of non-volatile memory (NVM) sets, each of the plurality of NVM sets corresponding to one of a plurality of regions of the non-volatile memory, and each of the plurality of regions comprising a plurality of dies; and a controller configured to:
- define an optimal transfer and processing unit (OTPU) size for communicating messages for the plurality of NVM sets, wherein the OTPU size for all messages communicated by the controller for the plurality of NVM sets are uniform, and wherein the controller defines a first OTPU size for a first configuration of the non-volatile memory, and a second different OTPU size for a second different configuration of the non-volatile memory; and
- communicate the messages for the plurality of NVM sets, each of the messages having the OTPU size.

* * * * *